United States Patent [19]
Ookita

[11] Patent Number: 5,987,308
[45] Date of Patent: Nov. 16, 1999

[54] PORTABLE TERMINAL HAVING A SHARED ANTENNA WITH REDUCED STANDING WAVE RATIO

[75] Inventor: Hideto Ookita, Yokohama, Japan

[73] Assignee: Kyocera Corporation, Kyoto, Japan

[21] Appl. No.: 08/891,626

[22] Filed: Jul. 9, 1997

[30] Foreign Application Priority Data

Jul. 9, 1996 [JP] Japan .................................. 8-198327

[51] Int. Cl.$^6$ ...................................................... H04B 1/44
[52] U.S. Cl. ........................ 455/83; 455/117; 455/272; 455/80; 333/1.1; 330/130
[58] Field of Search ................. 455/78, 80, 82, 455/83, 129; 333/1.1, 126, 129, 132, 134, 24.2; 330/130, 297, 127, 202

[56] References Cited

U.S. PATENT DOCUMENTS

| | | | |
|---|---|---|---|
| 4,525,675 | 6/1985 | Richmond et al. | 328/140 |
| 4,636,741 | 1/1987 | Mitzlaff | 330/127 |
| 5,065,453 | 11/1991 | Thomas | 455/286 |
| 5,093,667 | 3/1992 | Andricos | 342/372 |
| 5,412,414 | 5/1995 | Ast et al. | 342/174 |
| 5,423,082 | 6/1995 | Cygan et al. | 455/126 |
| 5,444,864 | 8/1995 | Smith | 455/84 |
| 5,604,470 | 2/1997 | Atokawa | 333/126 |
| 5,701,595 | 12/1997 | Green et al. | 455/83 |
| 5,815,803 | 9/1998 | Ho et al. | 455/78 |
| 5,822,684 | 10/1998 | Kitakubo | 455/78 |

FOREIGN PATENT DOCUMENTS 2305203  12/1990  Japan .
7046063  2/1995  Japan .

*Primary Examiner*—David R. Hudspeth
*Assistant Examiner*—Vijay B. Chawan
*Attorney, Agent, or Firm*—Loeb & Loeb, LLP

[57] ABSTRACT

It is an object of the present invention to provide a portable terminal which reduces an antenna standing-wave ratio and absorbs reflected waves without inserting an isolator so that a stable operation can be obtained efficiently with a compact, low-price body.

To achieve the above object, there is provided a portable terminal having antenna sharing means for sharing an antenna between transmission and reception, a power amplifier for high-power transmission and a low noise amplifier for reception, which comprises: suppression means for suppressing an antenna standing-wave ratio within a given range; a circulator for use as the antenna sharing means; and a protective circuit connected to an input end of the low noise amplifier for reception, wherein when a signal is transmitted from the power amplifier, a reflected wave output from the power amplifier and reflected by the antenna is suppressed by the suppression means to a given value or less, and losses of reflected wave are increased by extending a path of the reflected wave from the antenna to the power amplifier through the circulator carrying the reflected wave to the protective circuit and returning it from the protective circuit to the power amplifier, whereby the amount of the reflected wave to be sent back to the power amplifier is reduced. Therefore, such an isolator as used in the conventional does not need to be provided at the output end of the power amplifier for protecting the power amplifier, and as a result, the portable terminal can realize high efficiency with a low distortion characteristic.

18 Claims, 6 Drawing Sheets

PORTABLE TERMINAL HAVING A SHARED ANTENNA WITH REDUCED STANDING WAVE RATIO

BACKGROUND OF THE INVENTION

The present invention relates to a portable terminal for mobile communication and particularly to a high-power portable terminal having means for reducing an antenna standing-wave ratio to protect an output amplifier from a reflected wave caused by an antenna.

Conventionally, many portable terminals for mobile communication that employs a communication satellite or the like use a high-frequency, high-power time division duplex system (TDD system).

FIG. 1 is a diagram showing an exemplary structure of such a conventional portable terminal. As shown in FIG. 1, the conventional portable terminal has an antenna 1, a transmitter/receiver switch (Tx/Rx switch) 2, a part of microphone 11, a power amplifier 12, an isolator 13, a low-pass filter 14, a part of earphone 21, a low noise amplifier 22 and a band-pass filter 23. A controller, not shown, is also provided for various controls of the portable terminal such as dialing control.

In transmission, a speech signal input from a microphone (not shown) of the part of microphone 11 is converted and modulated into an electric signal. The output signal is amplified by the power amplifier 12, passed through the isolator 13 and filtered by the low-pass filter 14 so that excess high-frequency components will be eliminated from the output signal. Then the output signal is passed through the Tx/Rx switch 2 and transmitted from the antenna 1.

In reception, signals received by the antenna 1 are passed through the Tx/Rx switch 2. Then only a given frequency band of signals is selected by the band-pass filter 23, amplified by the low noise amplifier 22, demodulated in the part of earphone 21 and converted to a voice at an earphone (not shown).

When using high frequencies, a portion of the output signal from the power amplifier 12 is reflected by the antenna 1 and interference of the reflected wave may form a standing wave. The standing-wave ratio (maximum standing wave/minimum standing wave) at the antenna 1 is standardized to be within a fixed range. However, when the antenna 1 has been damaged or electromagnetic conditions have changed, an unusually large reflected wave may be sent back from the antenna 1 to the output end of the power amplifier 12 to cause an error or a failure in the power amplifier 12.

The isolator 13 is an element acting to pass signals only in the forward direction, which is inserted for absorbing reflected waves from the antenna 1 and protecting the power amplifier 12. As shown in FIG. 1, the use of the Tx/Rx switch 2 for changing over between transmission and reception permits the reflected waves to be directly sent to the output end of the power amplifier 12 when an abnormal condition such as failure of the antenna 1 has occurred. In such a case, the danger of error in the power amplifier 12 becomes large and therefore the isolator 13 is required for avoiding this error.

As shown in FIG. 2, another conventional portable terminal uses a circulator 3 instead of the Tx/Rx switch 2, which carries the reflected waves from the antenna 1 to the receiving side. In this technique, when transmission power is small (when the output of the power amplifier 12 is small), neither a protective circuit for the low noise amplifier 22 nor the isolator 13 is required. However, when the transmission power is large, a protective circuit 24 needs to be provided for protecting the low noise amplifier 22. Since the protective circuit 24 sends back the reflected waves from the antenna 1 through the circulator 3 to the transmitting circuit, the isolator 13 also needs to be connected to the output end of the power amplifier 12 for protecting the power amplifier 12.

The following drawbacks are present in the above conventional portable terminals.

(1) The isolator 13 is expensive and the use of the isolator 13 increases the total cost.

(2) The parts are too large to use in a compact portable terminal.

(3) Since the isolator 13 increases losses on the transmitting side from the antenna 1 to the power amplifier 12, the power amplifier 12 must be a high power type and this also increases the total cost. Further, such a high-power amplifier deteriorates distortion characteristics of the output signal.

(4) Increased power consumption of the power amplifier 12 reduces battery working time and hence duration of a call.

(5) Although a large-sized battery is required to secure the duration of a call, such a battery is too large to use in the portable terminal.

SUMMARY OF THE INVENTION

It is an object of the present invention to provide a portable terminal which reduces an antenna standing-wave ratio and absorbs reflected waves without inserting an isolator so that a stable operation can be obtained efficiently with a compact, low-price body.

To achieve the above object, the present invention provides a portable terminal having antenna sharing means for sharing an antenna between transmission and reception, a power amplifier for high-power transmission and a low noise amplifier for reception, which comprises: as shown in FIG. 3, suppression means for suppressing a standing-wave ratio at an antenna 1 to be within a given range; a circulator 3 for use as the antenna sharing means; and a protective circuit 24 connected to an input end of a low noise amplifier 22 for reception, wherein when a signal is transmitted from the power amplifier 12, a reflected wave output from the power amplifier 12 and reflected by the antenna 1 is suppressed by the suppression means to a given value or less, and losses of reflected wave are increased by extending a path of the reflected wave from the antenna 1 to the power amplifier 12 through the circulator 3 carrying the reflected wave to the protective circuit 24 and returning it from the protective circuit 24 to the power amplifier 12, whereby the amount of the reflected wave to be sent back to the power amplifier 12 is reduced. Therefore, such an isolator as used in the conventional does not need to be provided at the output end of the power amplifier 12 for protecting the power amplifier 12, and as a result, the portable terminal can realize high efficiency with a low distortion characteristic.

The suppression means may be a radome 31, made of a material permeable to electromagnetic waves, which covers the periphery of the antenna 1 to prevent a conductor from approaching at a given distance or closer so that a standing wave ratio will be kept within a given range.

According to another aspect of the present invention, a portable terminal further comprises, as shown in FIG. 5, an attenuator 26 arranged in parallel to the low noise amplifier 22, with switches 25 changing over between the low noise amplifier 22 and the attenuator 26 when switching over between transmission and reception, wherein when a signal is transmitted from the power amplifier 12, a reflected wave from the antenna 1 is suppressed by the suppression means to a given value or less, and further carried to and attenuated by the attenuator 26 through the circulator 3.

According to other aspect of the present invention, a portable terminal further comprises, as shown in FIG. 6, an isolator 27 arranged ahead of the protective circuit 24, with the input end of the low noise amplifier 22 connected to the protective circuit 24, wherein when a signal is transmitted from the power amplifier 12, a reflected wave output from the power amplifier 12 and reflected by the antenna 1 is suppressed by the suppression means to a given value or less, and further carried through the circulator 3 and the isolator 27 to the protective circuit 24, with the isolator 27 blocking the reflected wave from the protective circuit 24, whereby the reflected wave is prevented from returning to the power amplifier 12.

BRIEF DESCRIPTION OF THE DRAWINGS

The above and other objects and advantages and further description will now be discussed in connection with the drawings in which.

DESCRIPTION OF THE PREFERRED EMBODIMENTS

Figure 1:
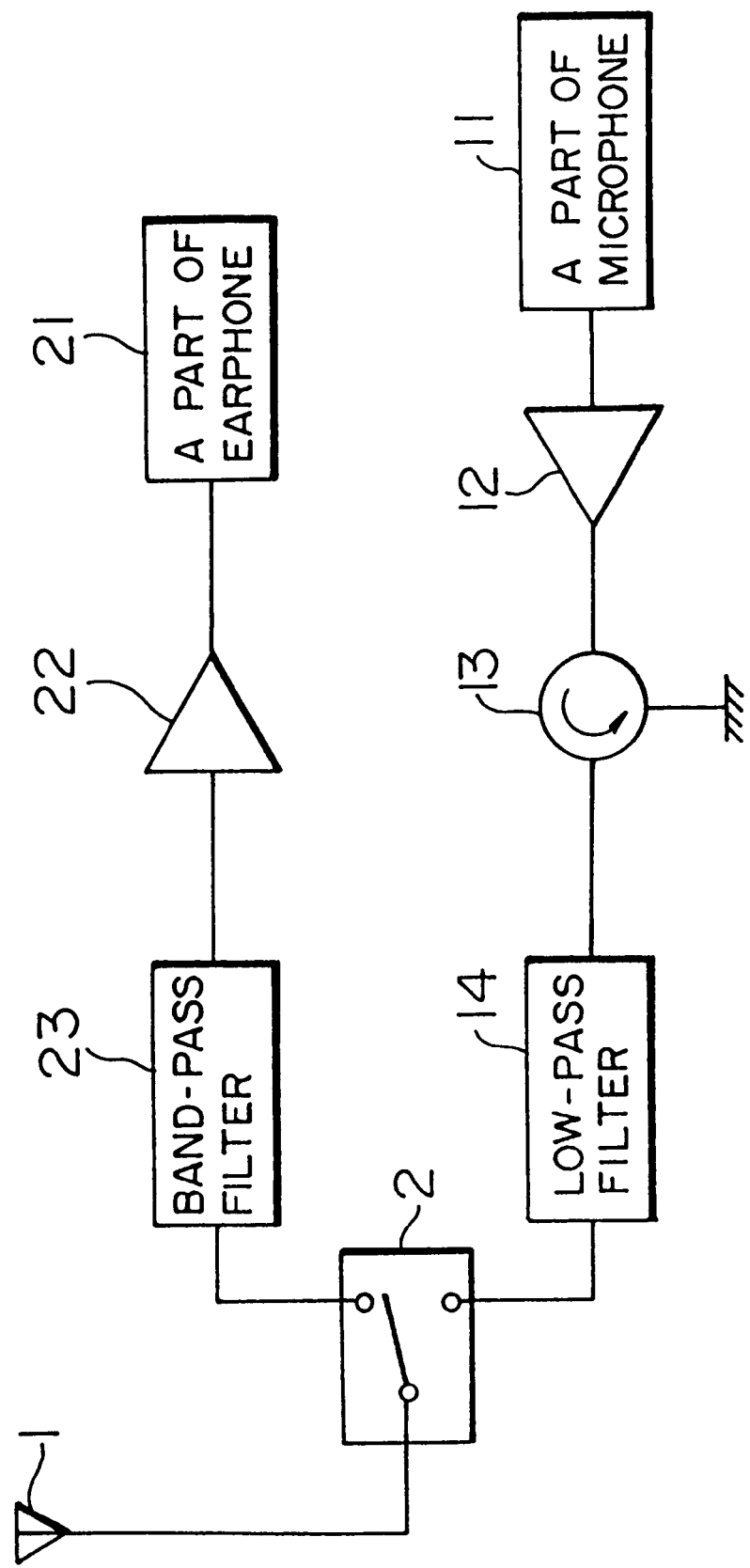
FIG. 1 is a block diagram showing an exemplary structure of a conventional portable terminal.
Figure 2:
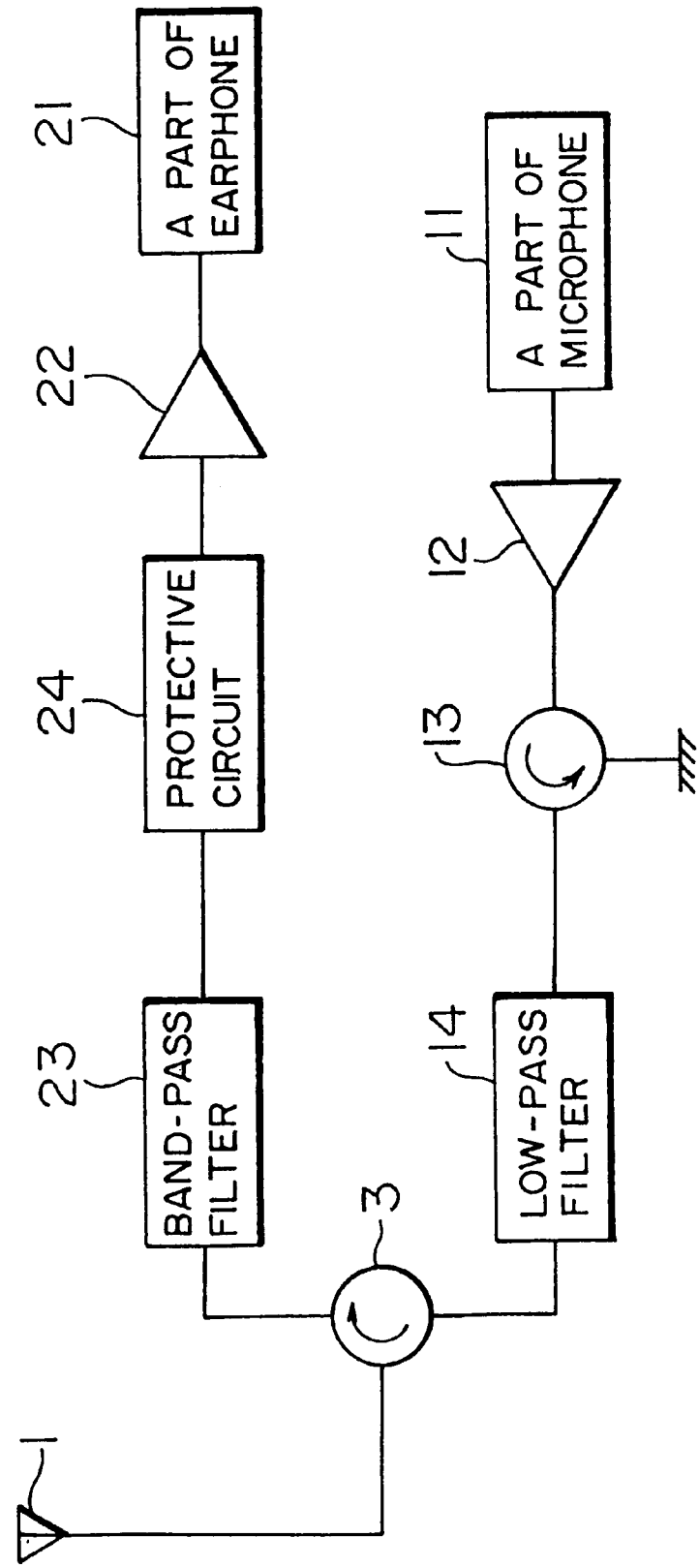
FIG. 2 is a block diagram showing an exemplary structure of another conventional portable terminal.

Referring to the drawings, embodiments of the present invention will be described in detail below.

Embodiment 1

Figure 3:
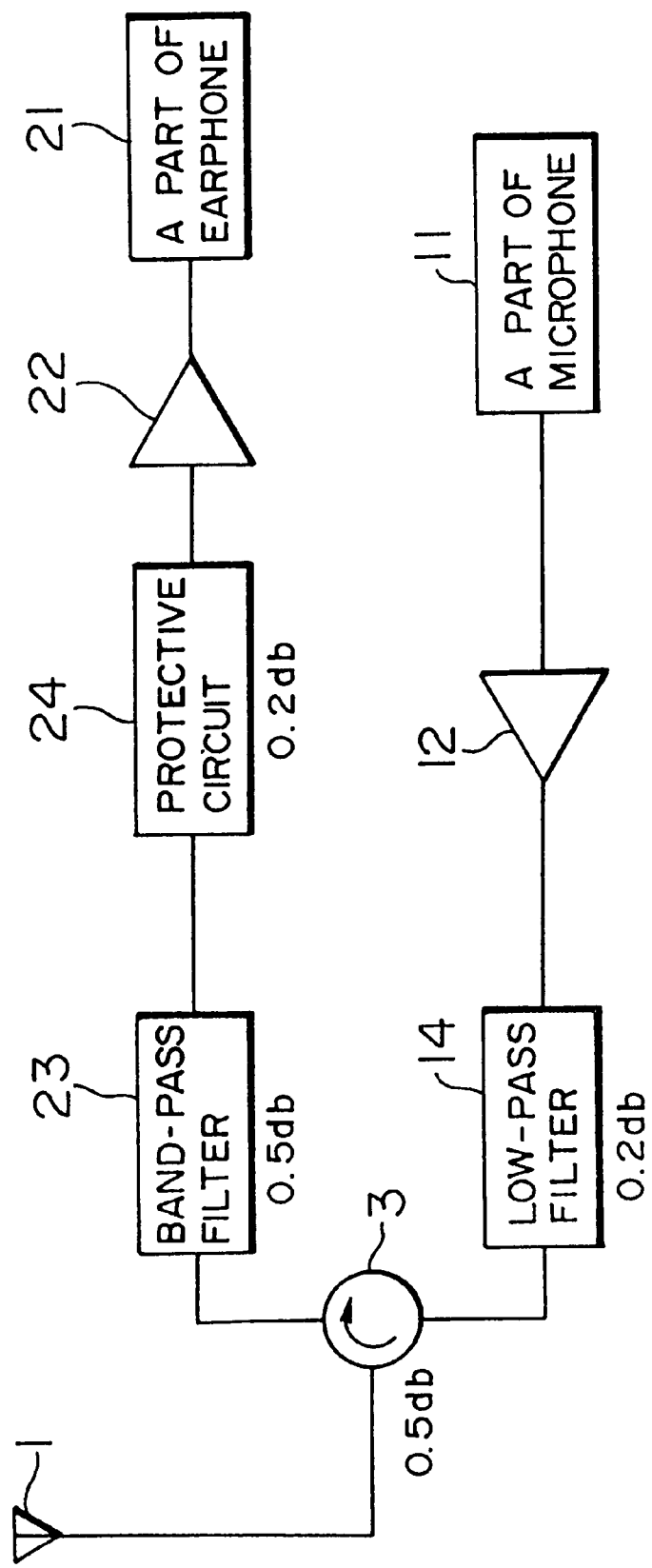
FIG. 3 is a block diagram showing an exemplary structure of a portable terminal according to an embodiment 1 of the present invention.

FIG. 3 is a diagram showing an exemplary structure of a portable terminal according to an embodiment 1 of the present invention. The portable terminal has an antenna 1, a circulator 3, a part of microphone 11, a power amplifier 12, a low-pass filter 14, a part of earphone 21, a low noise amplifier 22, a band-pass filter 23 and a protective circuit 24. Losses in the above elements are as follows: the circulator 3, 0.5 db; the low-pass filter 14, 0.2 db; the band-pass filter 23, 0.5 db; and the protective circuit 24, 0.2 db.

With the portable terminal in FIG. 3, when the standing-wave ratio (SWR) at the antenna 1 is infinite, the SWR of output to load at the power amplifier 12 is 1:5.2. When the acceptable SWR at the power amplifier 12 is 1:3.5, if the antenna 1 is so protected that the SWR at the antenna 1 is 1:10 or less, the portable terminal can be operated without an isolator.

Figure 4:
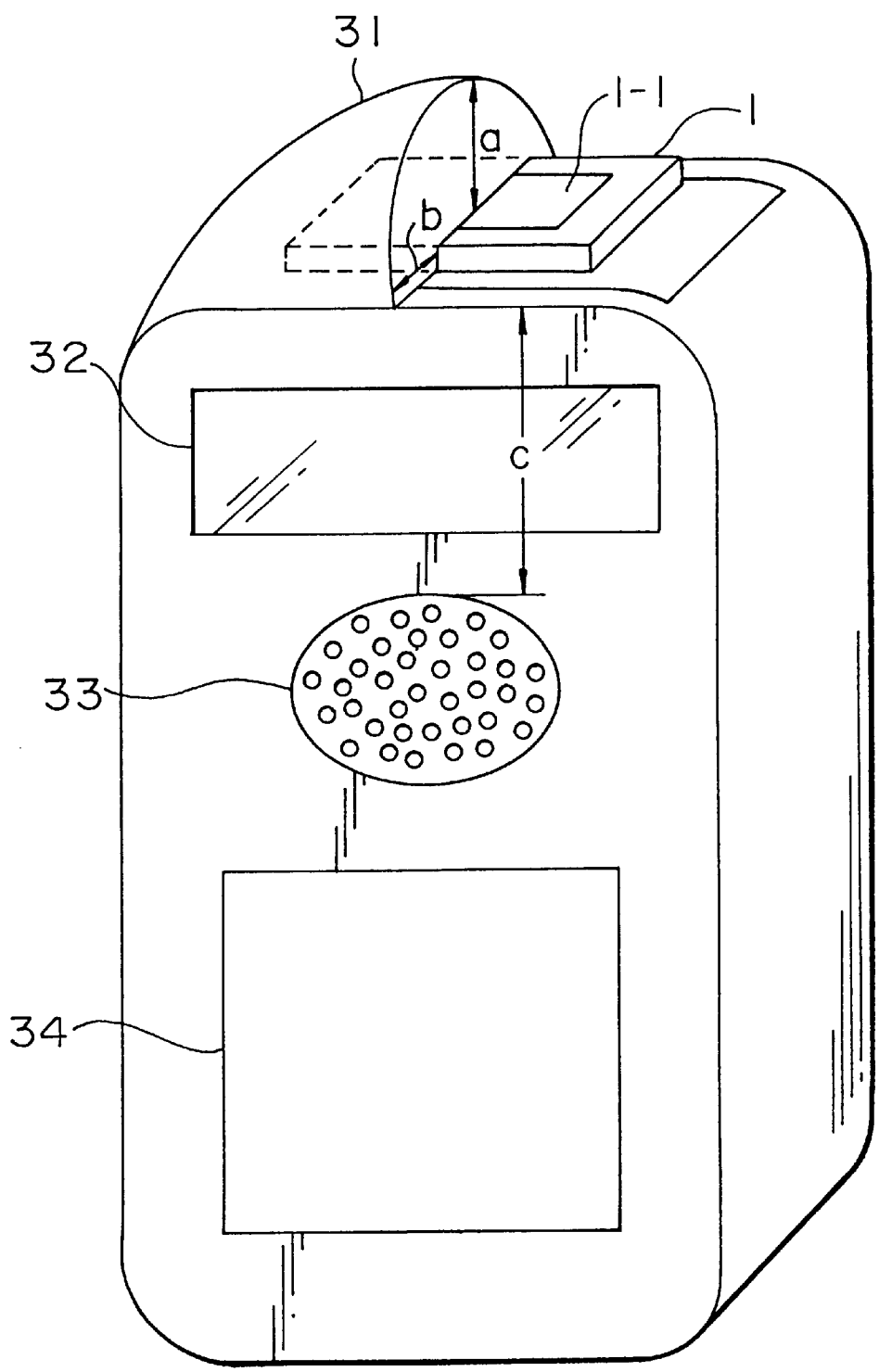
FIG. 4 is a schematic diagram showing an appearance of the portable terminal according to the embodiment 1 of the present invention.

FIG. 4 is a diagram showing an appearance of the portable terminal according to the embodiment 1 of the present invention. As shown in FIG. 4, the portable terminal uses a patch antenna as the antenna 1, mounting it on the top. The antenna 1 is protected by covering the periphery thereof with a radome 31. The radome 31 is made of a material permeable to electromagnetic waves.

In FIG. 4, references a and b denote distances from an antenna element 1-1 to the outer surface of the radome 31, respectively. Such distances are set to prevent a conductor from physically approaching the antenna 1 and so that the SWR never exceed a predetermined value.

Reference c denotes a distance from the antenna 1 to an earphone 33, which is set to prevent the SWR from varying under the influence of the user's head approaching the antenna 1 when using the portable terminal and so that the operation of the portable terminal can be kept stable. A display 32 and an operation panel 34 are also positioned not to affect the SWR.

As discussed above, the portable terminal according to the embodiment 1 uses the radome 31, made of a material permeable to electromagnetic waves, to cover the antenna 1 and suppress the SWR to a given value or less, so that the SWR of output to load at the power amplifier 12 can be kept within a range of acceptable SWRs. It is therefore unnecessary to connect the isolator 13 to the output of the power amplifier 12 unlike the conventional, and as a result, the portable terminal can realize high efficiency with a low distortion characteristic.

Embodiment 2

Figure 5:
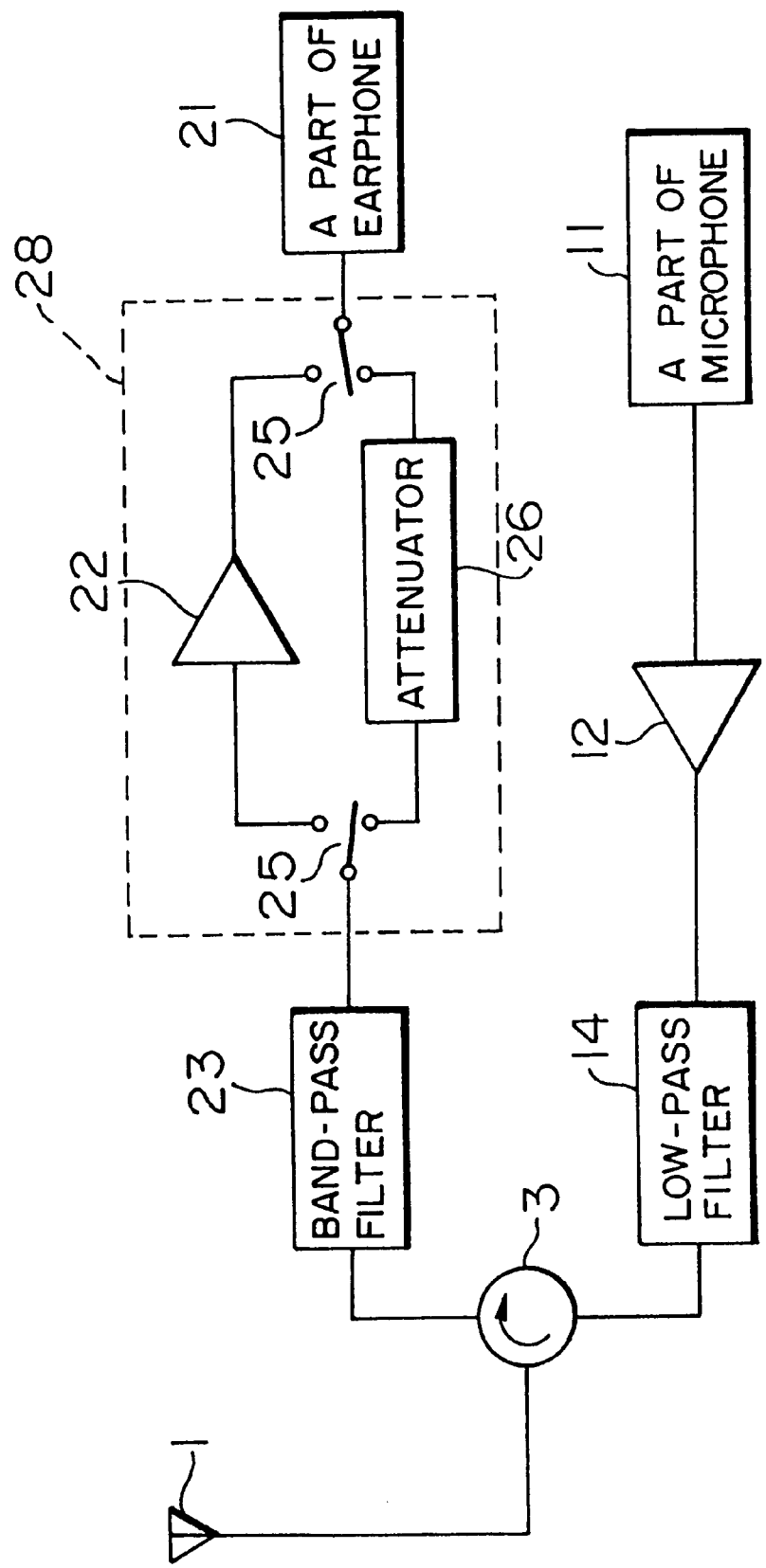
FIG. 5 is a block diagram showing an exemplary structure of a portable terminal according to an embodiment 2 of the present invention.

FIG. 5 is a diagram showing an exemplary structure of a portable terminal according to an embodiment 2 of the present invention. The portable terminal has an antenna 1, a circulator 3, a part of microphone 11, a power amplifier 12, a low-pass filter 14, a part of earphone 21, an AGC circuit 28 and a band-pass filter 23. The AGC circuit 28 is made up of a low noise amplifier 22, an attenuator 26 and switches 25, 25.

The portable terminal uses the AGC circuit 28 on the receiving side to consume (absorb) a reflected wave from the antenna 1. In the AGC circuit 28, the switches 25 changes over between the low noise amplifier 22 and the attenuator 26.

In transmission, the switches 25, 25 are connected to the attenuator 26 in response to input of a signal from a CPU, not shown, and the reflected wave from the antenna 1 is absorbed by the attenuator 26, thus protecting the low noise amplifier 22. Since no reflected wave is generated from the attenuator 26, the power amplifier 12 is independent of reflected wave.

According to the portable terminal of the embodiment 2, the attenuator 26 is provided in the receiving circuit for absorbing a reflected wave, and when a signal is transmitted, the switches 25, 25 changes over from the low noise amplifier 22 to the attenuator 26 to make the attenuator 26 absorb the reflected wave. It is therefore unnecessary to connect the isolator 13 to the output of the power amplifier 12 unlike the conventional, and as a result, the portable terminal can realize high efficiency with a low distortion characteristic.

Embodiment 3

Figure 6:
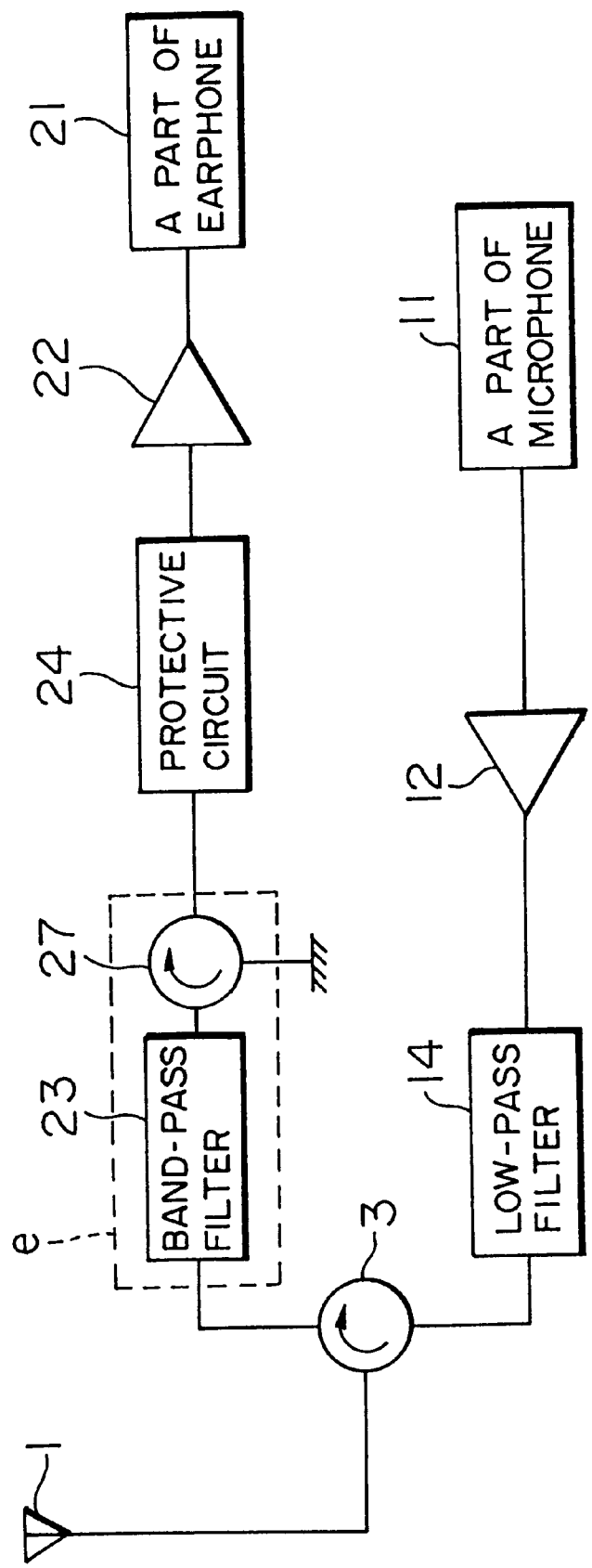
FIG. 6 is a block diagram showing an exemplary structure of a portable terminal according to an embodiment 3 of the present invention.

FIG. 6 is a diagram showing an exemplary structure of a portable terminal according to an embodiment 3 of the present invention. The portable terminal has an antenna 1, a circulator 3, a part of microphone 11, a power amplifier 12, a low-pass filter 14, a band-pass filter 23, an isolator 27, a protective circuit 24, a low noise amplifier 22 and a part of earphone 21. In this portable terminal, the isolator 27 is inserted between the band-pass filter 23 and the protective circuit 24 for the receiving circuit.

In transmission, a reflected wave from the antenna 1 is input to the protective circuit 24 through the circulator 3, the band-pass filter 23 and the isolator 27. Although the reflected wave is sent back from the protective circuit 24, the power amplifier 12 is independent of reflected wave because the isolator 27 blocks the reflected wave from the protective circuit 24.

Since the isolator 27 is inserted into the receiving circuit, there is less power consumption, and as a result, the isolator 27 is made more compact and simplified than the case the isolator is connected to the output of the power amplifier 12. Such an isolator 27 can be integrated with the band-pass filter 23 as a circuit component e.

According to the portable terminal of the embodiment 3 since the isolator 27 is connected to the output of the band-pass filter 23 for the receiving circuit, the reflected wave never returns to the power amplifier 12. It is therefore unnecessary to connect the isolator 13 to the output of the power amplifier 12 unlike the conventional, and as a result, the portable terminal can realize high efficiency with a low distortion characteristic.

What we claim is:

1. A portable terminal having antenna sharing means for sharing an antenna between transmission and reception, a power amplifier for high-power transmission and a receiving amplifier, comprising:

suppression means for suppressing an antenna standing-wave ratio to within a given range;

a circulator for use as said antenna sharing means; and a protective circuit connected to the input end of said receiving amplifier, wherein when a signal is transmitted from said power amplifier, a reflected wave output from said power amplifier and reflected by said antenna is suppressed by said suppression means to a given value or less, and losses of reflected wave are increased by extending a path of the reflected wave from said antenna to said power amplifier through said circulator carrying the reflected wave to said protective circuit and returning it from said protective circuit to said power amplifier, whereby the amount of the reflected wave to be sent back to said power amplifier is reduced.

2. A portable terminal as set forth in claim 1, wherein said suppression means is a radome, made of a material permeable to electromagnetic waves, which covers the periphery of said antenna to prevent a conductor from approaching at a given distance or closer so that a standing wave ratio will be kept within a given range.

3. A portable terminal having antenna sharing means for sharing an antenna between transmission and reception, a power amplifier for high-power transmission and a receiving amplifier, comprising:

suppression means for suppressing an antenna standing-wave ratio to within a given range;

a circulator for use as said antenna sharing means; and an attenuator arranged in parallel to said receiving amplifier, with switches changing over between said receiving amplifier and the attenuator when switching over between transmission and reception, wherein when a signal is transmitted from said power amplifier, a reflected wave from said antenna is suppressed by said suppression means to a given value or less, and further carried to and attenuated by said attenuator through said circulator.

4. A portable terminal as set forth in claim 3, wherein said suppression means is a radome, made of a material permeable to electromagnetic waves, which covers the periphery of said antenna to prevent a conductor from approaching at a given distance or closer so that a standing wave ratio will be kept within a given range.

5. A portable terminal having antenna sharing means for sharing an antenna between transmission and reception, a power amplifier for high-power transmission and a receiving amplifier, comprising:

suppression means for suppressing an antenna standing-wave ratio to within a given range;

a circulator for use as said antenna sharing means; and a protective circuit connected to the input end of said receiving amplifier and an isolator arranged ahead of the protective circuit, wherein when a signal is transmitted from said power amplifier, a reflected wave from said antenna is suppressed by said suppression means to a given value or less, and further carried through said circulator and said isolator to said protective circuit, with said isolator blocking the reflected wave from said protective circuit, whereby the reflected wave is prevented from returning to said power amplifier.

6. A portable terminal as set forth in claim 5, wherein said suppression means is a radome, made of a material permeable to electromagnetic waves, which covers the periphery of said antenna to prevent a conductor from approaching at a given distance or closer so that a standing wave ratio will be kept within a given range.

7. A portable terminal for receiving and transmitting communication signals comprising:

an antenna;

a receiving section including a receiving amplifier;

a transmitting section including a power amplifier;

a circulator connected to the antenna, the receiving section and the transmitting section for sharing the antenna between the receiving section and transmitting section;

a radome covering the antenna for suppressing an antenna standing wave ratio; and a protective circuit connected to an input end of the receiving amplifier, wherein when a signal is transmitted from the power amplifier, the antenna standing wave ratio is suppressed by the radome to below a predetermined value, a reflected signal from the antenna is directed to the protective circuit by the circulator, reflected from the protective circuit, and directed to the power amplifier by the circulator, whereby the reflected signal from the antenna is attenuated by a predetermined amount before reaching the power amplifier.

8. The portable terminal of claim 7, wherein the radome is made of a material permeable to electromagnetic waves and disposed over the antenna at a predetermined distance to prevent an object from approaching the antenna within the predetermined distance.

9. A portable terminal for receiving and transmitting communication signals comprising:

an antenna;

a receiving section including a receiving amplifier;

a transmitting section including a power amplifier;

a circulator connected to the antenna, the receiving section and the transmitting section for sharing the antenna between the receiving section and transmitting section;

a radome covering the antenna for suppressing an antenna standing wave ratio;

an attenuator arranged in parallel with the receiving amplifier; and switches for selectively connecting the receiving amplifier and the attenuator to the circulator, wherein when a signal is transmitted from the power amplifier, the antenna standing wave ratio is suppressed by the radome to below a predetermined value, and the reflected signal from the antenna is directed to the attenuator by the circulator and the switches and attenuated by the attenuator.

10. The portable terminal of claim 9, wherein the radome is made of a material permeable to electromagnetic waves and disposed over the antenna at a predetermined distance to prevent an object from approaching the antenna within the predetermined distance.

11. A portable terminal for receiving and transmitting communication signals comprising:

an antenna;

a receiving section including a receiving amplifier;

a transmitting section including a power amplifier;

a circulator connected to the antenna, the receiving section and the transmitting section for sharing the antenna between the receiving section and transmitting section;

a radome covering the antenna for suppressing an antenna standing wave ratio;

a protective circuit connected to an input end of the receiving amplifier; and an isolator connected between the protective circuit and the circulator to block the signal travelling from the protective circuit to the circulator, wherein when a signal is transmitted from the power amplifier, the antenna standing wave ratio is suppressed by the radome to below a predetermined value, the reflected signal from the antenna is directed to the protective circuit by the circulator and through the isolator, and the signal reflected from the protective circuit is prevented by the isolator from reaching the power amplifier.

12. The portable terminal of claim 11, wherein the radome is made of a material permeable to electromagnetic waves and disposed over the antenna at a predetermined distance to prevent an object from approaching the antenna within the predetermined distance.

13. A portable terminal for receiving and transmitting communication signals comprising:

an antenna;

a receiving section including a receiving amplifier;

a transmitting section including a power amplifier;

a circulator connected to the antenna, the receiving section and the transmitting section for sharing the antenna between the receiving section and transmitting section;

a radome covering the antenna for suppressing an antenna standing wave ratio; and means disposed on a signal path from the antenna to the power amplifier for attenuating a signal traveling from the antenna to the power amplifier, wherein when a signal is transmitted from the power amplifier, the antenna standing wave ratio is suppressed by the radome to below a predetermined value, and the reflected signal traveling from the antenna to the power amplifier is attenuated by the means for attenuating.

14. The portable terminal of claim 13, wherein the radome is made of a material permeable to electromagnetic waves and disposed over the antenna at a predetermined distance to prevent an object from approaching the antenna within the predetermined distance.

15. The portable terminal of claim 13, wherein when a signal is transmitted from the power amplifier, the means for attenuating prevents the signal reflected from the antenna from reaching the power amplifier.

16. The portable terminal of claim 13, wherein the means for attenuating comprises a protective circuit connected to an input end of the receiving amplifier, and wherein when a signal is transmitted from the power amplifier, the reflected signal from the antenna is directed to the protective circuit by the circulator, reflected from the protective circuit, and directed to the power amplifier by the circulator, whereby the reflected signal from the antenna is attenuated by a predetermined amount before reaching the power amplifier.

17. The portable terminal of claim 13, wherein the means for attenuating comprises:

an attenuator arranged in parallel with the receiving amplifier; and switches for selectively connecting the receiving amplifier and the attenuator to the circulator, and wherein when a signal is transmitted from the power amplifier, the reflected signal from the antenna is directed to the attenuator by the circulator and the switches and attenuated by the attenuator.

18. The portable terminal of claim 13, wherein the means for attenuating comprises:

a protective circuit connected to an input end of the receiving amplifier; and an isolator connected between the protective circuit and the circulator to block the signal travelling from the protective circuit to the circulator, and wherein when a signal is transmitted from the power amplifier, the reflected signal from the antenna is directed to the protective circuit by the circulator and through the isolator, and the signal reflected from the protective circuit is prevented by the isolator from reaching the power amplifier.

* * * * *